Nov. 27, 1923　　　　　　　　　　　　　　　　1,475,602
H. E. SHELLER
METHOD OF MAKING STEERING WHEELS
Filed Dec. 14, 1921　　　2 Sheets-Sheet 1
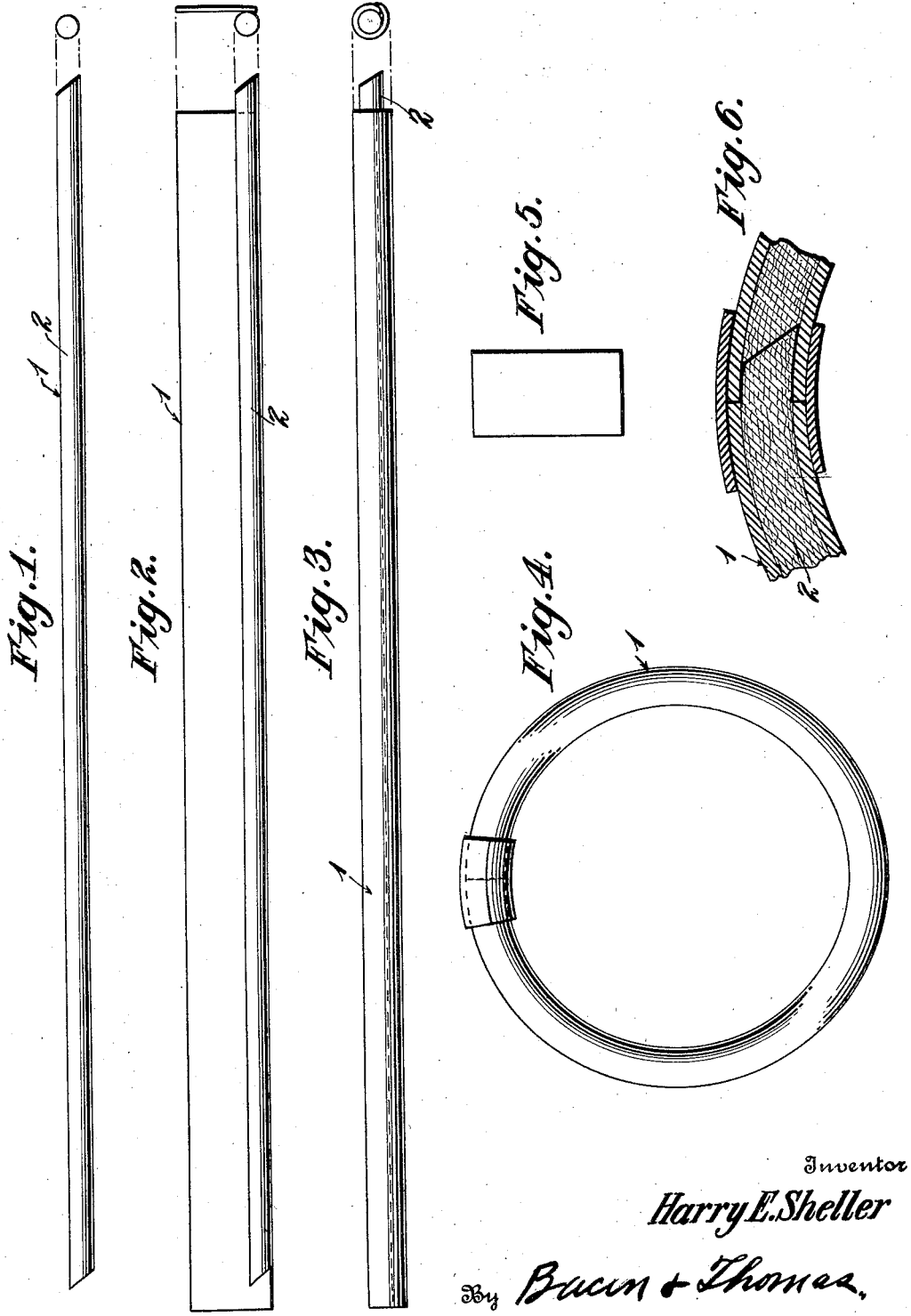
Inventor
Harry E. Sheller
By Bacon + Thomas,
Attorneys Nov. 27, 1923.
H. E. SHELLER
METHOD OF MAKING STEERING WHEELS
Filed Dec. 14, 1921
1,475,602
2 Sheets-Sheet 2
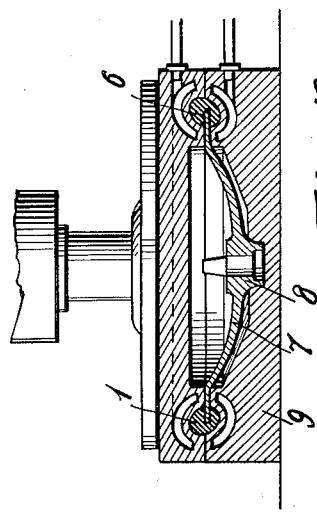
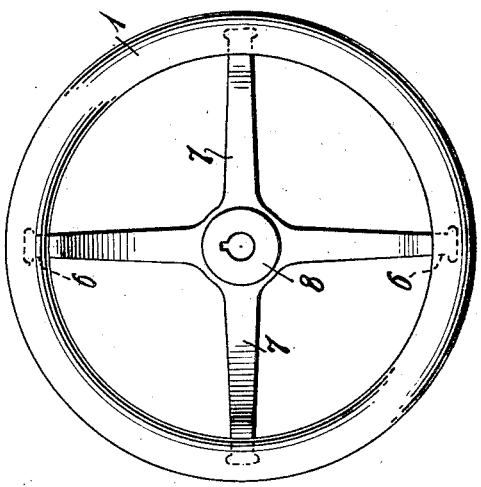
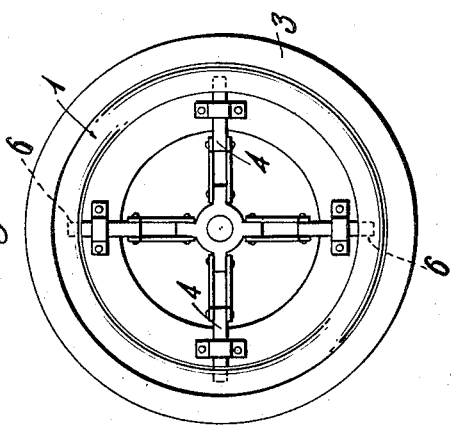
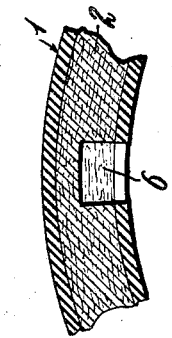
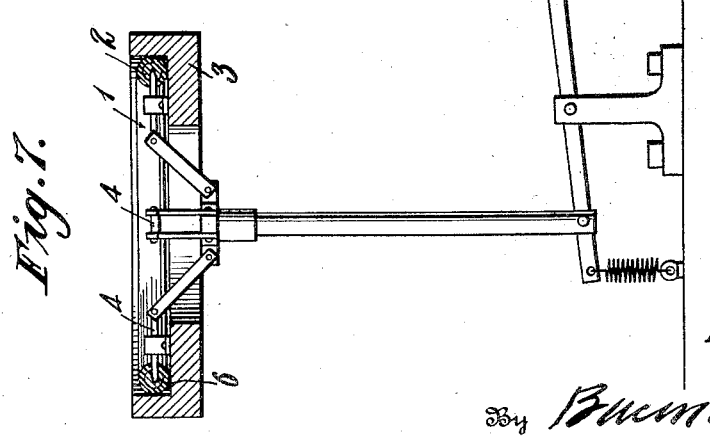
Inventor
Harry E. Sheller
By Bueno & Thomas.
Attorneys Patented Nov. 27, 1923.

1,475,602

UNITED STATES PATENT OFFICE.

HARRY E. SHELLER, OF PORTLAND, INDIANA. ASSIGNOR TO SHELLER WOOD RIM MANUFACTURING COMPANY, OF PORTLAND, INDIANA, A CORPORATION OF INDIANA.

METHOD OF MAKING STEERING WHEELS.

Application filed December 14, 1921. Serial No. 522,265.

To all whom it may concern:

Be it known that I, HARRY E. SHELLER, a citizen of the United States of America, residing at Portland, in the county of Jay and State of Indiana, have invented certain new and useful Improvements in Methods of Making Steering Wheels, of which the following is a specification.

The invention relates to a method for manufacturing steering wheels having a rubber or like plastic wheel rim.

It is an object of the invention to provide a method of rapidly producing steering wheels having plastic rims, which rims are permanently and firmly united to the steering wheel spokes. With this conception in mind, my invention consists primarily in placing a strip of raw plastic material in a circular form, in piercing the strip while in its raw or unvulcanized state to form radial apertures therein to receive the steering wheel spokes, in placing the rim with inserted spokes in a mold, and in vulcanizing the rim material to cause the material due to the heat and pressure of vulcanization to flow around and firmly embrace the enlarged ends of the spokes.

In the accompanying drawings, Figure 1 represents a view of the core; Fig. 2 a view of the core and cover; Fig. 3 a view of the above in cylindrical form; Fig. 4 a view of above formed in the shape of steering rim; Fig. 5 a view of splicing patch; Fig. 6 sectional view, enlarged, of spliced joint; Fig. 7 long-sectional view of inserting machine showing material therein; Fig. 8 plan of same; Fig. 9 enlarged fragmentary sectional view of the material showing one of the spoke receiving apertures; Fig. 10 sectional view of the wheel in a hydraulic vulcanizing mold; Fig. 11 view of complete wheel.

Referring now more particularly to the drawings, wherein like reference characters indicate corresponding parts, the numeral 1 designates the raw material from which the hand steering wheel is produced, the same comprising an inner core 2 of crude rubber and shoddy material, straw and fiber, etc., which has been produced in the usual tubing machine. This core is provided with a wrapping or cover of higher grade rubber made in a calender machine and cut in widths and lengths required for various sizes, the cover being rolled on the core mechanism or otherwise, and when vulcanized forms the smooth and hard surface of the wheel. The strip of material from which the wheel is formed is then placed within an inserting machine 3, which causes the blank to take the ultimate form of the steering wheel with the adjacent ends thereof lying in contact with one another. The ends of the strip may be cut straight, or they may be spliced as desirable. When within the inserting machine 2' the material forming the wheel is of course in a soft and easily workable state, and I mount within this inserting machine a plurality of radially slidable knives 4, which when operated by the crank 4, project outwardly the pointed ends piercing the material forming the wheel at the points 6 to form the spoke receiving apertures therein. These apertures extend about half way through the material, and are of a size in excess of the size of the ends of the spokes so as to permit the spokes to be readily inserted within the apertures. The spokes 7 projecting from the hub 8 of the wheel are inserted by hand or otherwise in these apertures, and the wheel with its inserted spokes is then placed within a vulcanizing mold 9 having two parts and heated by steam pipes to a temperature of approximately 325°, and under a pressure of about 75 pounds by an indirect heat treatment. The molds employed by me are preferably inserted within a hydraulic press A, while the vulcanization is taking place, and the plastic rim forming material is subjected to a hydraulic pressure of about 1600 pounds per square inch. This heat and pressure causes the raw plastic material to be thoroughly vulcanized, the ends of the spokes being firmly anchored and surrounded by the material. The spoke ends, as will be observed, are enlarged or have straight edges serrated so as to provide anchoring means for said spokes, and the plastic material forming the rim during vulcanization under heat and pressure flows around these enlarged or serrated spoke ends and unites the wheel to the spokes in a manner which largely prohibits accidental separation.

After the rim has been thoroughly vulcanized under this heat and pressure the same is removed from the molds and is treated in the usual manner to give the same a fine polish and appearance. The spokes are united more firmly to the rim than can be accomplished in following any of the present day methods of which I am aware, and manifestly by piercing the raw material of which the rim is composed, the same is an inexpensive operation because of the softness of the material, and the spoke receiving apertures can be formed sufficiently large to permit an easy insertion of the spokes, these apertures of course being filled during the vulcanization of the material to tightly grip the inserted spokes.

Having thus described my invention, what I claim is:

1. The process of manufacturing steering wheels, consisting in forming a core of material in a tubing machine, in wrapping said core with a covering of unvulcanized rubber, in then shaping the wrapped core in the form of an ultimate rim, in piercing the unvulcanized rubber coating and a portion of the core while formed in the shape of a rim to provide radial spoke receiving openings therein, in inserting spokes in said openings, and in vulcanizing the rim while spokes are held in said openings to cause the material of the rim to engage the spoke ends to anchor the rim to the spokes.

2. The process of manufacturing steering wheels, consisting in forming a core of material in a tubing machine, in wrapping said core with a covering of unvulcanized rubber, in then shaping the wrapped core in the form of an ultimate rim, in piercing the unvulcanized rubber coating and a portion of the core while formed in the shape of a rim to provide radial spoke receiving openings therein, in inserting spokes in said openings, in vulcanizing the rim while maintaining the same under a pressure of at least 1600 pounds per square inch to cause the material constituting the rim during the process of vulcanization to engage the ends of the spokes to firmly anchor said spokes when said material cools.

3. A process of manufacturing plastic steering wheels consisting in forming a core of material of a mixture of rubber and a filler, in wrapping said core with a covering of unvulcanized rubber, in shaping the wrapped material in the form of an ultimate rim, in piercing the unvulcanized rubber coating and a portion of the core to form radial spoke receiving openings therein, in inserting spokes in said openings, and in vulcanizing the rim while spokes are held in said openings to cause the material of the rim to engage the spoke ends and anchor the rim to the spokes.

In testimony whereof I affix my signature.

HARRY E. SHELLER.